United States Patent

[11] 3,631,428

[72] Inventor Wayne J. King
Leucadia, Calif.

[21] Appl. No. 805,916
[22] Filed Nov. 19, 1968
[45] Patented Dec. 28, 1971
[73] Assignee Pacific Micronetics, Inc.
San Diego, Calif.

[54] QUARTER-HALF CYCLE CODING FOR ROTATING MAGNETIC MEMORY SYSTEM
11 Claims, 3 Drawing Figs.

[52] U.S. Cl. .......................................................... 340/174.1G

[51] Int. Cl. .......................................................... G11b 5/04
[50] Field of Search .......................................................... 340/174.1
G, 174.1, 174.1 H

[56] References Cited

UNITED STATES PATENTS

| | | | |
|---|---|---|---|
| 3,174,141 | 3/1965 | Sullivan et al. | 340/174.1 |
| 3,264,623 | 8/1966 | Gabor | 340/174.1 |
| 3,303,486 | 2/1967 | Young | 340/174.1 |
| 3,356,934 | 12/1967 | Halfhill et al. | 340/174.1 |
| 3,377,583 | 4/1968 | Sims, Jr. | 340/174.1 |
| 3,491,349 | 1/1970 | Sevilla et al. | 340/174.1 |

*Primary Examiner*—Bernard Konick
*Assistant Examiner*—Vincent P. Canney
*Attorney*—Smyth, Roston & Pavitt

ABSTRACT: A system for coding information in a rotating magnetic memory, the system having means for representing, for example, a "1" by a one-half cycle portion of a wave such as a rectangular wave, and having a given frequency, and representing a "0" by one-quarter portion of a similarly shaped wave having the same amplitude but only half the frequency of the first wave.

INVENTOR
WAYNE J. KING
BY Lew Schwartz
ATTORNEY

QUARTER-HALF CYCLE CODING FOR ROTATING MAGNETIC MEMORY SYSTEM

BACKGROUND OF THE INVENTION

Rotating magnetic memories are now well known in the art. Such memories are characterized by a surface carrying a magnetic medium, hereinafter referred to as a disc, and a read/write head in close proximity to the disc surface. Current is passed through a coil or winding on the read/write head to establish a magnetic field in the head, which field spreads out when it crosses a gap provided in the head. This spreading or fringing field will then set up a pattern of magnetized areas in the magnetic medium on the disc. The disc and head have relative movement, and the time allowed for the reading or writing of each bit of information is referred to as a bit frame, which time also determines the system bit frequency.

To recover information stored on the disc, for example, the disc may be moved past the head such that the leakage magnetic field associated with the magnetized areas of the disc will link the head, thus generating small voltages in the coils associated with each read/write head. These voltages will be proportional to the rate of change of flux passing through the gap.

The type of code used for the information stored and recovered from the magnetic disc is an essential part of the design of a rotating magnetic memory system, as is well known to those skilled in the art. Many codes are known, and it is also known that the selection of a particular one of the known codes results in certain advantages and disadvantages. For purposes of example, three well-known coding schemes will be discussed below, it also known that there are other coding schemes. Further, the three schemes to be discussed relate to saturating-type recording systems as opposed to nonsaturating-type recording systems, as the present invention relates to such saturating-type recording systems.

A first well known system is the nonreturn-to-zero-change-on-ones system, typically referred to as the NRZI system. This code requires that, in the presence of a one during a given bit frame, the output pass from one side of a base line voltage to another side, and that no change take place in the voltage during the occurrence of a zero in a given bit frame. The primary virtue of the NRZI system is that a maximum of one flux change is required per bit. This system has two primary problems: susceptibility to noise and lack of ready adaptability to self-clocking. The NRZI system is sensitive to noise because signal detection is based on sensing the amplitude of the signal. Random noise will have a finite amplitude, and thus to differentiate between legitimate signals and noise the read system must incorporate fairly elaborate peak-sensing circuitry and also establish a threshold where noise, and sometimes low-amplitude legitimate signals, are rejected. This system is not inherently self-clocking because flux changes do not occur during each bit frame. Those skilled in the art will recognize that adaptability to self-clocking is a desirable feature.

A second well-known coding scheme is the Manchester system. This is a phase modulation technique in which both ones and zeros are represented by full-cycle waves occurring during each bit frame, the one and zero full-cycle waves being 180° out of phase with one another. Thus, if one establishes the convention of sampling the bit during the first half of each bit cycle, one can state that a zero is a positive signal and one is a negative signal, when the full-cycle waves are referred to a zero base line. One advantage of the Manchester system is that only two frequencies are utilized, full-bit frequency and one-half bit frequency, which simplifies the design of a read amplifier. Also an advantage is the fact that the system is relatively immune to noise because only a small portion of the signal is sampled. Yet another advantage is that the signal is adaptable to self-clocking because bit frames can be defined from the fact that the signal changes polarity (a zero crossing) in the middle of each bit frame.

The major disadvantage of the Manchester system is that there are two flux changes per bit frame. This means that, because of bit crowding, significant amplitude degradation and peak shifts occur at higher packing densities when compared, for example, with the NRZI system described above, which has a maximum of one flux change per bit time.

A third well-known system is the Frequency Doubling System. In the Frequency Doubling System, a one will be shown as a full cycle occurring during each bit frame, while a zero will be shown as a half cycle occurring during each bit frame, or vice versa as desired. Note that the same two frequencies are utilized for Frequency Doubling as in the above-described Manchester System, the bit frequency and one-half the bit frequency. The basic difference between the two systems is that the decoding of the Manchester System involves sampling the polarity of the signal at a specific time within the bit frame, while the Frequency Doubling System involves measuring the time between zero crossings. Such time measurements may be accomplished with one shot multivibrators, RC integrators, or counters. The primary disadvantage of the Frequency Doubling System is the same as that of the Manchester System described above, in that there can be two flux changes per bit frame.

The system of this invention overcomes the above-described disadvantages of prior known systems, while including the advantages of the above systems, in that the system requires a maximum of one flux change per bit frame, is compatible with the need for a self-clocking feature, and has a bit capacity per inch of recording media which is doubled over the prior known systems described above.

SUMMARY OF THE INVENTION

Briefly described, the system of this invention provides means for coding digital input data, having first and second states, to a rotating magnetic memory in a form such that, for example, a one is represented by a half-cycle portion of a selected wave having a given frequency, while a zero is represented by a quarter-cycle portion of a similar wave having the same amplitude but only half the frequency of the first wave. Thus, in any sequence of binary signals coded according to this invention, if the first of any pair of successive signals is a zero, then the phase angle at the beginning of the signal immediately following whether a one or zero, is exactly 90° greater than the phase angle at the beginning of the first signal. Conversely, if the first of any pair of successive signals is a one, then the phase angle at the beginning of this signal immediately following is exactly 180° greater than the phase angle at the beginning of the first signal.

DESCRIPTION OF THE PREFERRED EMBODIMENT

Figure 1:
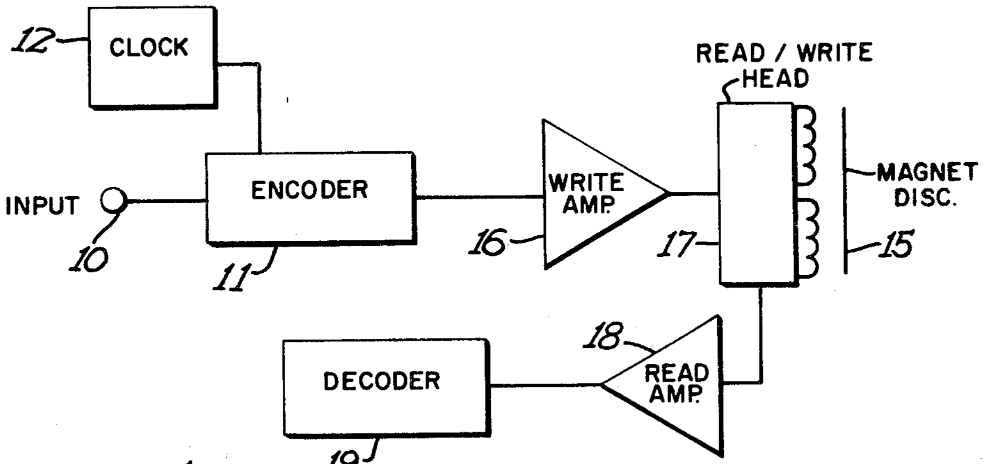
FIG. 1 is a block diagram of a system incorporating this invention.

Referring first to FIG. 1, there is seen a block diagram of a read/write system for a rotating magnetic memory. An input terminal 10 is adapted to receive a train of pulses representing the ones and zeros of binary information. The input train of pulses is presented to an encoder 11. Encoder 11 is properly timed by input pulses from a clock 12. When a pulse has been properly encoded it is presented to a write amplifier 16, and then to a selected read/write head, here shown as 17. Head 17 will then convert the coded pulse into a magnetic field which will fringe on and be stored in its coded form on magnetic disc 15.

When recovery of information is desired, a selected read/write head such as 17 will convert the magnetic field from the stored coded pulse on disc 15 into an electrical coded pulse. This pulse will pass through a read amplifier 18 to a decoder 19 where the character of the coded pulse will be determined.

To best understand the operation of the apparatus of this invention, the coding scheme should first be discussed with reference to FIGS. 2 and 3. The coding system is such that a half cycle per bit frame is used to denote a one, while a quarter cycle per bit frame is used to denote a zero. The representation of ones and zeros could obviously be reversed without departing from the spirit of this invention. As can be seen in the first column of FIG. 2, titled "ones," four separate representations of a half cycle can be used to denote a one. The same is true of the four quarter cycle representations of a zero as seen in the second column of FIG. 2, titled "zeros."

Figure 2:
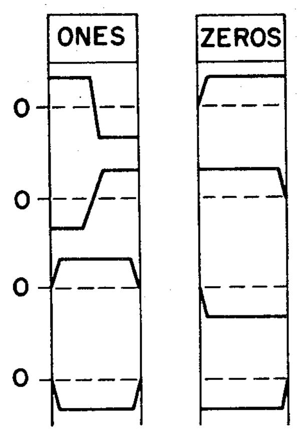
FIG. 2 is a graph depicting the representative wave forms of the coding system of this invention.

The primary advantage of the coding system of this invention may clearly be seen in FIG. 2, that is, a maximum of one flux change is required per bit frame. Obviously, this will result in a greatly increased pulse density on the recording medium such as disc 15. For example, the above described Manchester and Frequency Doubling Systems each require two flux changes per bit frame, and therefore where they may be capable of a bit density of 1,000 bits per inch, the use of the quarter-half cycle coding system of this invention would increase that capability to 2,000 bits per inch.

Figure 3:
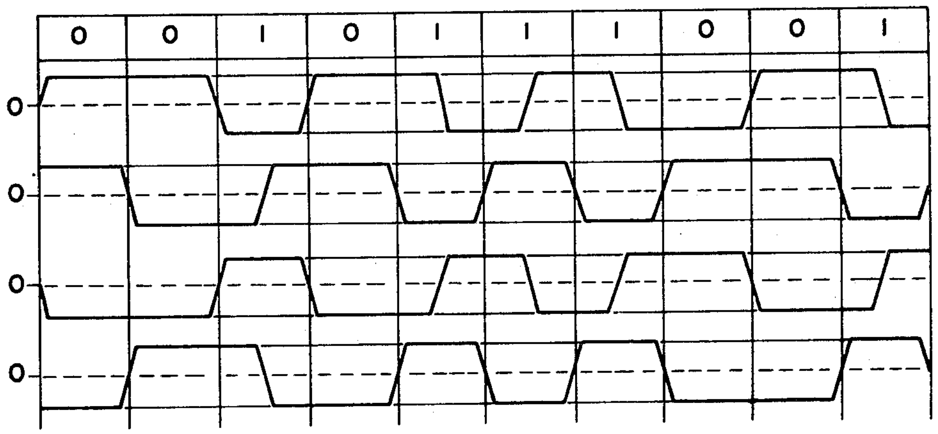
FIG. 3 is a graph depicting a plurality of patterns coded according to the system of this invention, each representing the same series of binary digits.

Referring now to FIG. 3, there can be seen along the first row an arbitrary series of ones and zeros representing binary information as would be presented to input terminal 10 of FIG. 1. Encoder 11 will operate on each of the ones and zeros to be coded in the manner represented in FIG. 2. Thus, the arbitrary series of ones and zeros of the first row of FIG. 3 could be encoded into any one of the coded waveforms representing the other four rows of FIG. 3. Further study of FIG. 3 will indicate that three frequencies are actually utilized. It will be apparent that if row one were all zeros, the resulting coded waveform would have a frequency equivalent to one-quarter the bit frequency, while an all ones pattern would have a frequency of one-half the bit frequency. Note that a repeating series of a one and two zeros can have a frequency of three-eighths of the bit frequency. Therefore, the decoding of the quarter-half cycle waveform will require a time measurement precision of one-quarter bit frequency.

Again referring to FIGS. 2 and 3, it becomes apparent that the phase angles at the beginning of each coded wave portion are those angles commonly identified as 0°, 90°, 180° and 270°. A study of FIG. 3 will make apparent the fact that in any sequence of binary signals coded according to this invention, if the first of any pair of successive signals is a zero, than the phase angle at the beginning of the signal immediately following, whether it is a one or a zero, will be exactly 90° greater than the phase angle at the beginning of the first signal. Also, if the first of any pair of successive signals is one, then the phase angle at the beginning of the signal immediately following, whether it is a one or a zero, is exactly 180° greater than the pulse angle at the beginning of the first signal.

The design of encoder 11 may take many forms, all within the capability of one skilled in the art, to accomplish its purpose of converting an input one or zero to, respectively a half-cycle or quarter-cycle waveform. Encoder 11 is clocked by input clock pulses from clock 12, which may be derived from a clock recorded on the disc or from an oscillator which operates independently of the disc. Thus, as timed by clock 12, encoder 11 will cause the write amplifier 16 to switch currents between the two coils in read/write head 17 for periods of time related to a half or quarter cycle depending on the input information at terminal 10. The resulting magnetic field, be it for a quarter cycle or a half cycle, will be stored within one frame on disc 15.

Prior to decoding information read from disc 15, it is common for self-clocking systems to require that bit boundaries be established. To accomplish this, a series of bits, called the preamble, are recorded prior in time to the actual stored information on disc 15. This preamble comprises a known series of bits.

When the information bits stored on disc 15 are read by read/write head 17, they will be presented in coded form, and amplified by read amplifier 18 such that both the one and zero coded patterns will have the same amplitude. The amplified, coded pulses are then presented to decoder 19, which also may take many forms within the design capability of those skilled in the art. Decoding of the quarter-half cycle system information of this invention is dependent on the measurement of time between zero crossings of the coded output waveform. As mentioned above, such time has previously been measured with many different circuits including one-shot multivibrators, RC integrators and counters. Due to the fact that one-shot multivibrators and RC integrators are analog devices, a counter, which is a digital device, is preferred for the apparatus of this invention.

It will be recognized from FIGS. 2 and 3 that zero crossings should occur only at specific times, and the fact of no zero crossing at a proper time, or a zero crossing at a wrong time, can be detected and an error can be declared if the specific time zones are properly described in the decoder. With the use of a counter, all necessary time zones can be readily recognized for description. When analog circuits are used in the decoder, separate measuring circuits are required for each time zone.

As stated above, it is preferred that a counter be used in the apparatus of this invention. It has been determined that there is an advantage to using an oscillator to drive the counter, which oscillator has a frequency output equal to at least eight times that of the bit frequency. Thus, when the counter is driven by this oscillator, each bit frame may be divided into eight or more equal time intervals. Through the use of logical gating, these time intervals may be combined in any desired manner to define time zones. If it is desired to use the same counter for both the encoder and decoder, it is only necessary to use a sufficient number of bistable units in the counter to cover the maximum number of counts needed in either the read or write operation.

The apparatus described above provides a coding system for rotating magnetic memories which is unique and advantageous over that which was known in the prior art. Nothing in the description of the preferred embodiment represented by the drawing and the explanation thereof is intended to limit the scope of this invention.

I claim:

1. In a rotary magnetic memory system including an input terminal to which binary information pulses are presented in form of bivalued bits at a particular rate corresponding to a particular bit rate frequency and having means for recording the encoded information pulses in sequential bit frames, one bit frame, and having means for recovering the recorded and encoded information pulses, the improved method for encoding the bits for recording including the steps of:

converting each input binary information pulse of a first binary state into a half-cycle pulse of a selected frequency corresponding to half the bit rate frequency of the binary information to be recorded, the half-cycle cycle pulse to be recorded to extend over the entire length of a bit frame;

converting each input binary information pulse of the second binary state into a quarter-cycle pulse of one-half said selected frequency, the quarter-cycle pulse to be recorded to extend over the entire length of a bit frame.

2. The method of claim 1 further including the step of decoding the recovered coded information by measuring time between zero-crossings of the coded information pulses.

3. The method of claim 1 wherein the input binary information is converted to half-cycle and quarter-cycle pulses of generally equal amplitude.

4. The method of claim 1 wherein the selected frequency is one-half the bit frequency of the system.

5. The method of claim 1 wherein the step of encoding includes controlling the encoding by timing pulses.

6. In a rotary magnetic memory system having a system bit frequency and including means for storing information and means for recovering information, the method of coding binary information pulses comprising the steps of:

A. receiving binary information pulses;

B. providing a code pulse having a frequency of one-half the system bit frequency for each binary information pulse of a first state and providing a code pulse having a frequency of one-quarter the system bit frequency for each binary information pulse of a second state; and C. providing all code pulses to the means for storing.

7. The method of claim 6 in which Step B includes the steps of:

D. turning on a coded pulse output on receipt of a binary information pulse of either the first or second state.

E. counting a period of time equal to one-half the time of the system bit frequency for each binary information pulse of the second state; and F. turning off the coded pulse output at the end of the respective period of time.

8. The method of claim 6 including the decoding steps of:

D. actuating the means for recovering the stored coded pulses;

E. amplifying the recovered coded pulses;

F. counting the time between zero crossing, of the coded pulses; and

G. comparing each counted time between zero crossing with system bit frequency time to determine the original binary information.

9. The method of recording bivalued digital data along a track and in sequential bit frames, one frame per bit, each bit frame having a trailing boundary and a leading boundary coinciding with the trailing boundary of the respectively immediately preceding frame, the carrier being in one or the other of two different states of energization along the track, there being transition zones between areas of oppositely different states, comprising the steps of:

providing a transition on the trailing boundary of a bit frame for a bit of a first one of the two values to be recorded in the bit frame, only if the leading boundary of the bit frame has not been provided with a transition; and providing a transition on the trailing boundary of a bit frame for a bit of the other one of the two values to be recorded in the bit frame, only if the leading boundary of the frame has been provided with a transition, while providing a midframe transition, only if the leading boundary of the frame has not been provided with a transition.

10. The method of encoding bivalued bits for recording the bits sequentially presented at a particular rate, corresponding to a particular bit rate frequency for recording in sequential bit frames, one bit per frame, comprising the steps of:

converting each bit of a first value into a half-cycle pulse of a frequency half of the bit rate frequency to be recorded within a bit frame;

converting each bit of a second value into a quarter-cycle pulse of one quarter the bit rate frequency to be recorded within a bit frame; and selecting the phase of a pulse in relation to the phase of the preceding pulse corresponding to two sequential bits to be recorded in sequential bit frames to have the same phase angle at the boundary between the two frames;

a half-cycle pulse selected to extend from 0° to 180°, 180° to 360°, 90° to 270° or 270° to 90°, at the half-bit rate frequency, and covering the length of a bit frame, a quarter-cycle pulse selected to extend from 0° to 90°, 90° to 180°, 180° to 270° or 270° to 360° at the quarter bit rate frequency and covering the length of a bit frame.

11. The method of encoding bivalued bits for recording, the bits sequentially presented at a particular rate corresponding to a particular bit rate frequency, for recording in sequential bit frames, one bit per frame, comprising the steps of:

converting each bit of a first value into a half-cycle wave portion of a frequency half of the bit rate frequency, to be recorded within a bit frame;

converting each bit of a second value into a quarter-cycle wave portion of a frequency of one quarter the bit rate frequency, to be recorded within a bit frame; and selecting the phase of each wave portion as beginning at a bit frame boundary to be larger by 90° than the selected phase angle of the wave portion as beginning at the preceding frame boundary.

* * * * *